US012722325B2

(12) United States Patent
Perumal et al.

(10) Patent No.: US 12,722,325 B2
(45) Date of Patent: Sep. 1, 2026

(54) PARTICLE COMPOSITIONS AND RELATED METHODS AND USES TO FORM SINTERED SILICON CARBIDE BODIES

(71) Applicant: ENTEGRIS, INC., Billerica, MA (US)

(72) Inventors: Thines Kumar Perumal, Singapore (SG); Subhash Guddati, Singapore (SG); Christopher James Yannetta, Weatherford, TX (US); Montray Leavy, Singapore (SG); Troy Scoggins, Decatur, TX (US); Aravind Vasanthakumar, Singapore (SG)

(73) Assignee: Entegris, Inc., Billerica, MA (US)

( * ) Notice: Subject to any disclaimer, the term of this patent is extended or adjusted under 35 U.S.C. 154(b) by 275 days.

(21) Appl. No.: 18/382,644

(22) Filed: Oct. 23, 2023

(65) Prior Publication Data

US 2024/0139993 A1 May 2, 2024

Related U.S. Application Data

(60) Provisional application No. 63/419,585, filed on Oct. 26, 2022.

(51) Int. Cl.
*B28B 1/00* (2006.01)
*B33Y 10/00* (2015.01)
(Continued)

(52) U.S. Cl.
CPC .............. *B28B 1/001* (2013.01); *B33Y 10/00* (2014.12); *B33Y 40/20* (2020.01); *B33Y 70/10* (2020.01);
(Continued)

(58) Field of Classification Search
CPC ....... B28B 1/001; B29C 64/10; B29C 64/106; B29C 64/141; B29C 64/153;
(Continued)

(56) References Cited

U.S. PATENT DOCUMENTS 4,017,480 A 4/1977 Baum
4,677,082 A 6/1987 Alford
(Continued)

FOREIGN PATENT DOCUMENTS

JP H11236266 A 8/1999
KR 20030013543 A 2/2003

OTHER PUBLICATIONS

Du et al., Binder Jetting Additive Manufacturing of Silicon Carbide Ceramics: Development of Bimodal Powder Feedstocks by Modeling and Experimental Methods., Applied Materials Division, Argonne National Laboratory., pp. 1-20., Year 2020.

*Primary Examiner* — Nahida Sultana

(57) ABSTRACT

The present invention relates to a feedstock composition comprising inorganic particles having a multi-modal particle size distribution and comprising a collection of irregular fine particles having a fine particle size distribution and an average fine particle diameter, and a collection of irregular coarse particles having a coarse particle size distribution and an average coarse particle diameter that is in a range from 4 to 7 times the average fine particle diameter. The feedstock composition further comprising a binder composition that is adapted to solidify to form a body comprising the inorganic particles and solidified binder composition. Additionally, the present composition provides a method of forming a shaped body that comprises inorganic particles dispersed in binder composition as well as a method of forming a low porosity inorganic sintered body.

11 Claims, 2 Drawing Sheets

(51) Int. Cl.

| | |
|---|---|
| ***B33Y 40/20*** | (2020.01) |
| ***B33Y 70/10*** | (2020.01) |
| ***C04B 35/565*** | (2006.01) |
| ***C04B 41/53*** | (2006.01) |

(52) U.S. Cl.
CPC ............ *C04B 35/565* (2013.01); *C04B 41/53* (2013.01); *C04B 2235/3826* (2013.01); *C04B 2235/5436* (2013.01); *C04B 2235/5472* (2013.01); *C04B 2235/77* (2013.01)

(58) Field of Classification Search
CPC ....... B29C 64/165; B29C 64/40; B33Y 10/00; B33Y 40/20; B33Y 70/10; C04B 35/365; C04B 41/53; C04B 2235/3826; C04B 2235/5472; C04B 2235/77; C04B 35/638; C04B 2235/349; C04B 35/6316; C04B 2235/608; C04B 35/634; C04B 2235/5427; C04B 2235/81
See application file for complete search history.

(56) References Cited

U.S. PATENT DOCUMENTS

| | | | | |
|---|---|---|---|---|
| 5,618,767 | A | 4/1997 | Benker | |
| 5,814,272 | A | 9/1998 | Zeller | |
| 7,367,875 | B2 | 5/2008 | Slutz | |
| 8,142,845 | B2 | 3/2012 | Rashed et al. | |
| 12,205,762 | B2 * | 1/2025 | Cui | H01F 1/0577 |
| 2016/0325495 | A1 * | 11/2016 | Kuhn | C04B 35/6263 |
| 2019/0201977 | A1 * | 7/2019 | Ng | B29C 64/209 |
| 2020/0189145 | A1 * | 6/2020 | Cramer | B28B 17/0063 |
| 2021/0171814 | A1 * | 6/2021 | Sarangi | C04B 35/638 |

* cited by examiner

PARTICLE COMPOSITIONS AND RELATED METHODS AND USES TO FORM SINTERED SILICON CARBIDE BODIES

FIELD

Described are multi-modal particle compositions that contain irregularly-shaped particles that have at least two different particle size modes, derivative compositions such as feedstock compositions that contain the particle composition in combination with an optional binder and are useful to form shaped bodies, and methods of using the multi-modal particle compositions and feedstock compositions for forming shaped bodies.

BACKGROUND

Powder materials made of a collection of small similarly-sized and shaped solid particles are used commercially in a range of processes to form shaped bodies made from the particles. The shaped body may be rigid, porous, non-porous, etc., and can have size and shape features within very broad limitations. The powders and the shaped body may be made of a variety of different types of materials, including organic (polymeric) particles and inorganic particles (e.g. ceramic, or metal, including alloys).

By certain common methods of using a powder material, a powder composition can be melted to form a flowable liquid, and then molded or extruded to form a shaped body. With these methods, the particles are melted into a flowable liquid during shaping and the original size and shape features of the particles are eliminated. The original size and shape feature of the particles can have little significance with respect to the properties of the shaped body.

Other methods do not require particles to be melted, flowed, and molded or extruded when forming a shaped body. Consequently, the original size and shape properties of the particles are significant relative to the properties of the final shaped body. Some methods of forming a shaped body from a powder can include, generally, a step of forming the particles into a shaped precursor body that has a desired size and shape, and that contains the particles in their original form. The shaped precursor body is then heated to a temperature that causes the particles of the shaped precursor body to combine by fusing and optionally melting to form a final shaped body that retains the shape and size of the shaped precursor body.

By some such methods, examples steps include: forming the particles into "feedstock" material that contains the particles optionally dispersed with one or more added ingredients such as a "binder" or other additive; forming the feedstock into a shaped precursor body (sometimes referred to as a "green body") that includes the particles still in individual particle form; and then heating (e.g., "sintering" for metal or ceramic particles) the shaped precursor body to cause the particles to become fused or melted together at contacting surfaces to form a finished shaped body.

When forming a shaped body (precursor body or final shaped body) by these methods, the size and shape properties of particles of a powder ingredient can affect the properties of the shaped body (shaped precursor body or final shaped body or both). For example, some types of shaped bodies may be designed to include spacing between the particles, e.g., to be a final shaped body that is porous. For these types of bodies, the particles can exhibit a relatively low packing density. Alternately, if desired, a shaped body may be designed to include reduced or minimal spacing between particles, e.g., to form a final shaped body that has a minimal or a low porosity. For these types of bodies, the particles desirably exhibit a relatively high packing density.

SUMMARY

The following describes multi-modal particle compositions that contain irregularly-shaped particles, with the particles having at least two different particle size distribution modes, and with the multiple particle size distribution modes resulting in an increased packing density of the multi-modal particle composition.

This description also relates to compositions (e.g., "feedstock") and articles (e.g., various types of three-dimensional "shaped bodies") that contain a multi-modal particle composition as described, or that are formed from a multi-modal particle composition as described. Also described are examples of methods of using a feedstock composition to form a shaped body, e.g., by a compaction method or an additive manufacturing method.

When forming a shaped body using a powder compaction method using irregularly-shaped particles, no suitable models or guidelines are available to choose the particle size and diameter ratio to achieve high packing density. A "McGeary model" is available for combining coarse and fine powders to achieve desired packing density for powders of spherical particles, but this does not apply to irregular particles. To select relative sizes and amounts of irregular particles, for achieving a high packing density, the amounts and sizes must be identified experimentally.

As follows, compositions and methods are described that involve multi-modal compositions of irregular particles that have a relatively high packing density. The particle compositions, referred to as "multi-modal particle compositions," can contain any types (polymer, metal, ceramic) and sizes of particles, and can be used for forming any type of shaped body, by any useful technique, including by a molding technique, a compressive technique (e.g., isotactic compression), or by any useful additive manufacturing technique.

In one aspect, this description relates to a powder composition that has a multi-modal particle size distribution. The composition contains: a collection of irregular fine granular particles having a fine particle size distribution and an average fine particle diameter (D50 value), and a collection of irregular coarse granular particles having a coarse particle size distribution and an average coarse particle diameter (D50 value) that is in a range from 4 to 7 times the average fine particle diameter (D50 value).

In another aspect, this description relates to a feedstock composition that includes inorganic particles and binder composition. The feedstock composition contains inorganic particles having a multi-modal particle size distribution. The inorganic particles include: a collection of irregular fine particles having a fine particle size distribution and an average fine particle diameter, and a collection of irregular coarse particles having a coarse particle size distribution and an average coarse particle diameter that is in a range from 4 to 7 times the average fine particle diameter. The feedstock composition also includes binder composition that is adapted to solidify to form a body that contains the inorganic particles and solidified binder composition.

In yet another aspect, this description relates to a method of forming a shaped body that contains inorganic particles dispersed in binder composition. The method includes using feedstock composition that contains inorganic particles having a multi-modal particle size distribution. The feedstock composition contains: a collection of irregular fine particles having a fine particle size distribution and an average fine particle diameter, and a collection of irregular coarse particles having a coarse particle size distribution and an average coarse particle diameter that is in a range from 4 to 7 times the average fine particle diameter, and binder composition. The method includes forming the feedstock composition into a shaped body that contains the inorganic particles and solidified binder composition.

Still another aspect of the description relates to a method of forming a low porosity inorganic sintered body. The method includes using feedstock composition that contains inorganic particles having a multi-modal particle size distribution. The feedstock composition contains: a powder composition having a multi-modal particle size distribution, comprising a collection of irregular fine particles having a fine particle size distribution and an average fine particle diameter (D50 value), and a collection of irregular coarse particles having a coarse particle size distribution and an average coarse particle diameter (D50 value) that is in a range from 4 to 7 times the average fine particle diameter, and binder composition. The feedstock composition is formed into shaped precursor body that contains solidified binder composition and the inorganic particles. The shaped precursor body is heated to a temperature that causes the irregular fine particles and the irregular coarse particles to become fused together to form the inorganic sintered body.

DETAILED DESCRIPTION

Figure 1:
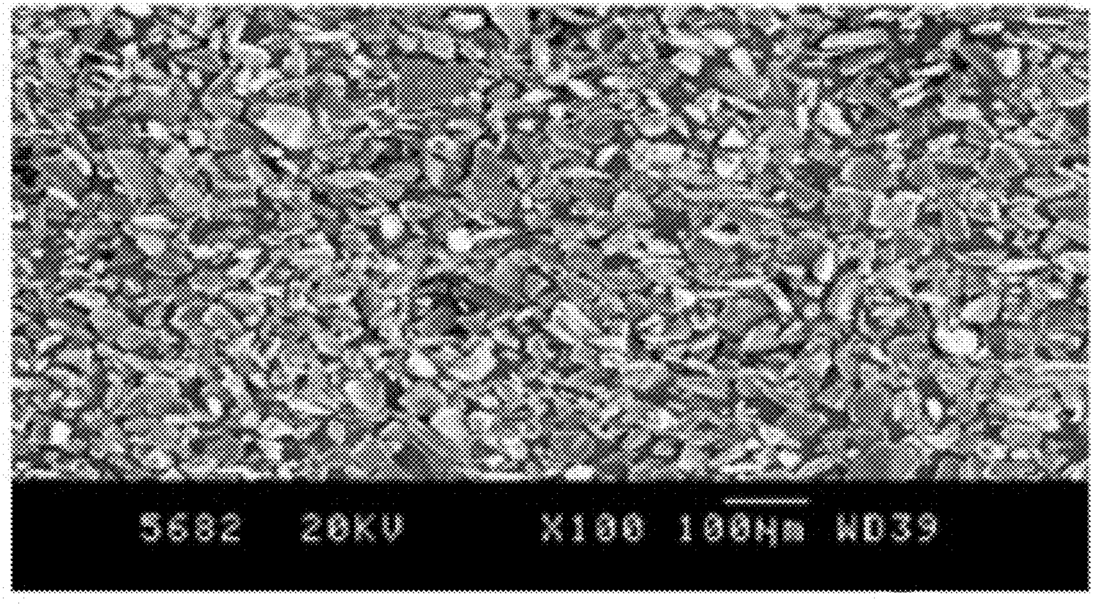
FIG. 1 is a SEM image of an example of a collection of particles as described.

The following relates to multi-modal particle compositions that contain irregularly-shaped particles, with the particles having at least two different particle size distribution modes, and with the multiple particle size distribution modes causing an increased packing density of the multi-modal particle composition.

The multi-modal particle compositions contain two different collections of irregularly-shaped granular particles (i.e., "irregular granular particles" or "irregular particles" herein). The two collections each have an average particle size (diameter) that is different from the average particle size of the other collection. One collection of particles is a collection of relatively smaller-sized ("fine") particles having a lower average particle size, and a second collection of particles is a collection of relatively larger-sized ("coarse") particles having a higher average particle size. To achieve a desirably high packing density of the particles in the multi-modal particle compositions, the average particle size of particles of the collection of coarse particles can be in a range from 4 to 7 times the average particle size of particles of the collection of fine particles.

Also preferably, the collection of fine particles and the collection of coarse particles can each have a relatively wide particle size distribution (see infra), to further increase the packing density of the multi-modal particle composition.

This description also relates to compositions (e.g., "feedstock") and articles (e.g., various types of three-dimensional "shaped bodies") that contain a multi-modal particle composition as described or that are formed from a multi-modal particle composition as described. Also described are examples of methods of using a feedstock composition to form a shaped precursor body, e.g., by a compaction method or an additive manufacturing method, and further processing the shaped precursor body by steps that include heating the shaped precursor body to form a final shaped body.

An example of a composition that contains a multi-modal particle composition is a feedstock compositions that contains the multi-modal particle composition in combination with binder composition that allows the feedstock to be shaped into a desired three-dimensional form. The feedstock composition can be used to form a shaped precursor body that contains the particles of the multi-modal particle composition distributed within the binder composition, with the particles remaining in their original particle forms. The shaped precursor body can be further processed by steps that include heating or sintering the shaped precursor body to form a final shaped body in which the individual particles of the multi-modal particle composition have been fused together, meaning that the particles will partially melt, with melting occurring at the particle surfaces to cause adjacent particles to become structurally fused together.

A multi-modal particle composition as described contains solid particles in the form of grains, pellets, or granules, in the absence of a significant amount of liquid, i.e., are considered dry and in the form of a "powder." The composition is substantially dry and flowable, with the particles being movable relative to each other and with air space existing between the particle surfaces. A multi-modal particle composition contains two distinct types (e.g., collections) of particles, with each collection having a characteristic particle size distribution mode that is different from the other collection.

As used herein, a "collection" of particles refers to a volume of individual solid particles that have common shape and size characteristics (i.e., "irregular" and "granular"), including sizes (diameters) that fall within a particle size distribution that exhibits a shape of a curve, e.g., a bell curve. The particles in the form of the collection are substantially dry and flowable, with the particles being movable relative to each other and with air space existing between the particle surfaces. Optionally, and typically, the particles may be compositionally similar or identical, e.g., made of a single type of ceramic, polymer, or metal material.

Examples of inorganic materials that may be useful as particles of a multi-modal particle composition include inorganic particles that are metal (including metal alloys) or ceramic. Metal particles may contain (comprise, consist of, or consist essentially of) one or more different metals, either as a pure metal or as an alloy. The term "metal" as used herein refers to any metallic or metalloid chemical element or an alloy of two or more of these elements. Example metals include iron, refractory metals (e.g., tungsten, molybdenum, tantalum), titanium, and nickel. Examples of metal alloys include stainless steel, another iron or steel alloy, nickel alloys, titanium alloys, among others.

Example ceramics include metal oxides, e.g., zirconia ($ZrO_2$), alumina ($Al_2O_3$), silicon carbide, etc. Certain more specific examples include ceramic powder materials that are prepared by mechanically processing larger pieces of ceramic material to form smaller pieces, these being sometimes referred to as "mechanically produced powders" prepared by a milling process. Other examples of a useful ceramic material are the types of silicon carbide powder referred to as "recrystallized silicon carbide" and "alpha" and "beta" silicon carbide materials.

The particles of each of the two different collections of particles are considered to be "irregular" granular particles (or "granular particles") that do not have a high aspect ratio (length:width), and are not spherical. Example particles of a collection can be characterized generally as being irregularly shaped, non-spherical, and having a range of values of relative roundness and aspect ratio.

An example measure that can assist to identify granular particles as described is aspect ratio, which is the ratio of length of an individual particle to width of the particle, as applied to irregularly-shaped particles. The aspect ratio of individual granular particles of the present description may be at least 1.3 or at least 1.5 (length/width), e.g., in a range from 1.5 to 10.

Another measure that can assist in identifying granular particles as described is a measure of "relative roundness." Relative roundness is a measure of how closely a shape of an object approaches that of a mathematically perfect circle, and may be measured using an optical camera. Particles that are spherical or approaching spherical will have a relative roundness value of at least 0.8 or 0.9, and less than 1.0 (which is spherical). Individual irregular granular particles, and an average of all granular particles of different collections of particles as described herein, may have a relative roundness that is below 0.7 e.g., in a range from 0.2 to 0.7.

Based on these shape features, particles that are considered irregular granular particles are not spherical particles, which have a mostly or entirely rounded surface with an aspect ratio in a range from 1.2:1 to 1:1.2. The irregular granular particles also are not high aspect ratio particles, meaning that the irregular granular particles do not have an aspect ratio that is greater than 10.

The described granular particles are also not of a type that is considered to be "dendritic." Dendritic particles are described in U.S. Pat. No. 5,814,272. As presented therein, the term "dendritic" refers to a highly anisotropic, irregular morphology characterized by particles having one or more filaments, having irregular surfaces, and individually having one dimension that is substantially greater than the other two dimensions of the filament. The filaments can be straight or bent and can also be branched or unbranched. Dendritic particles are also characterized by low packing efficiencies compared to particles of more regular morphology and, therefore, form powders of lower apparent (bulk) density than those formed by particles of more regular morphology. The dendritic particles are still further characterized by being formed by a process that includes: (1) heating a powder comprising non-dendritic metal particles under conditions suitable to form a lightly sintered material; and (2) breaking the lightly sintered material to form a powder comprising dendritic metal particles.

Examples of particles that can be considered to be "irregular granular particles" include particles that have one or more features of relative roundness and aspect ratio presented above. These particles may be further characterized as having multiple edges and corners that are either sharply angular or slightly angular or rounded, with surfaces between the edges and corners that may be significantly flat, or slightly curved. Edges of the particles may be relatively sharp (e.g., jagged) and surfaces may be substantially flat (i.e., planar) or slightly rounded or curved to produce a collection of particles that is visually similar to granular, faceted, angular or slightly rounded particles that make up sand, abrasive granules, roofing granules, or the like.

A single, non-limiting example of a collection of irregular granular particles that can be useful in a multi-modal particle composition like particles is shown at FIG. 1.

A multi-modal particle composition as described, as well as each of a first collection of particles ("fine particles") and a second collection of particles ("coarse particles"), includes (comprise, consist of, or consist essentially of) a significant portion of the total particles of the multi-modal composition or the collection that are irregular granular particles as described. Examples of multi-modal particle compositions and of collections of fine or coarse particles as described can contain at least 80, 90, 95, or 99 percent of particles that exhibit these features of irregular granular particles, based on the total amount of particles in the multi-modal particle composition or the collection.

A collection of particles as described can be described as having a statistical distribution of different particle sizes, e.g., based on the diameters of the particles. Sizes of particles within a collection are commonly represented as a frequency distribution curve, which is a plot of the frequency of particles within a sample of particles (percent, on an y axis), of particles that have a particular size (diameter, e.g., microns) on a logarithmic x axis.

A collection of particles of the present description, e.g., a collection of irregular fine granular particles, a collection of irregular coarse granular particles, or both separately, can have a mono-modal particle size distribution characterized by a particle size (diameter) distribution that is in the form of a continuous curve that is bell-shaped or approximately bell-shaped (e.g., Gaussian), having a minimum particle size at one end of the curve, a maximum particle size at a second end of the curve, a single peak (maxima) between the first and second ends, a continuous and gradually increasing curve between the first end and the single peak, and a continuous and gradually decreasing curve between the single peak and the second end. The curve can also be characterized by standard deviation values that define the "width" or "narrowness" of the curve.

Figure 2:
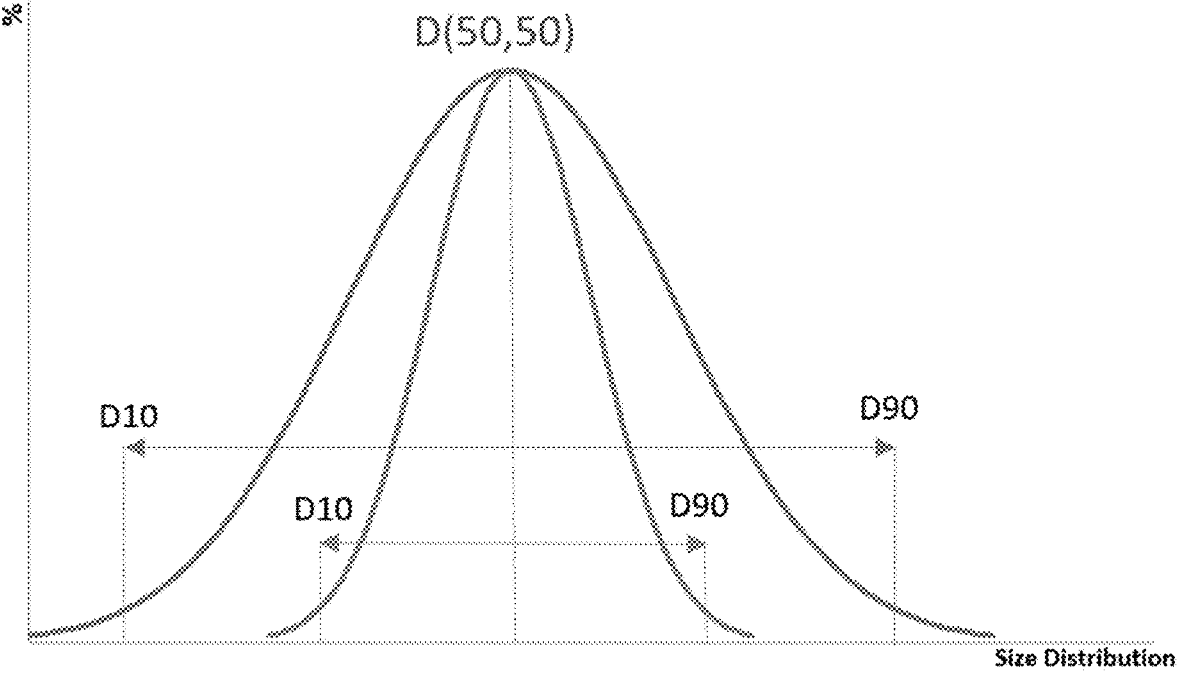
FIG. 2 shows examples of particle size distributions.

Example particle size distributions of useful mono-modal collections of irregular granular particles are shown at FIG. 2. The particle size distributions of the irregular granular particles are exemplary, and particles for use according to the present description can have different particle size distributions compared to the examples of FIG. 2.

FIG. 2 shows two particle size distribution curves. Each curve is a mono-modal bell-shaped curve that plots the frequency (percent, y-axis) of particles within a collection of particles over the range of sizes (diameters) of the particles (x-axis, on a logarithmic scale). Each of the two frequency curves has a minimum particle size at one end of the curve, a maximum particle size at a second end of the curve, a single peak (maxima) between the first and second ends of the curve, a continuous and gradually increasing curve between the first end and the single peak, and a continuous and gradually decreasing curve between the single peak and the second end.

By common terminology, particle size datapoints on an x-axis of a particle size distribution curve can be identified based on the amount (in percent) of particles in the measured sample that have a size (e.g., diameter) that is greater than a particle size datapoint at the x-axis. For example, FIG. 2 identifies locations on the particle size distribution curves that are labeled D10, D50, and D90. These represent particle size (diameter) values on the x-axis that correspond to a particle size (diameter) that is larger than 10 percent of all particles in the measured sample (D10), or that is larger than 50 percent of all particles in the measured sample (D50), or that is larger than 90 percent of all particles in the measured sample (D90).

Also referring to FIG. 2, two different curves are shown, with each curve having a different "width." The width of a particle size distribution curve refers to the relative distance between the low end of the curve and the high end of the curve. As shown at FIG. 2, one curve has a relatively narrower particle size distribution and a second curve has a relatively wider particle size distribution.

According to example mono-modal collections of particles as described, used to prepare a multi-modal particle composition, the use of mono-modal collections of particles that have a relatively wider particle size distribution is preferred, for preparing a multi-modal particle composition that has a relatively high packing density. A multi-modal particle composition in turn is preferred for preparing a feedstock composition that also has densely-packed particles, a shaped precursor body that has densely-packed particles, and a finished shaped body that has a low porosity.

A multi-modal particle composition of the present description contains two collections of mono-modal irregular particles, and each collection has a statistical distribution of different particles sizes. A characteristic of a collection of particles is a median diameter of the particles (D50) in the collection, which is a diameter at which fifty percent of the particles in the collection have a larger diameter and at which fifty percent of the particle in the collection have a smaller diameter.

A different characteristic is the relative width or narrowness of the distribution, meaning a distance between the size of the largest particles and a size of the smallest particles in the collection. The width or narrowness can be expressed by a standard deviation value of the particle size distribution curve. Examples of a useful or preferred standard deviation of a collection of irregular fine granular particles may be in a range from 1 to 5. Examples of a useful or preferred standard deviation of a collection of irregular coarse granular particles may be in a range from 1 to 5.

As a related measure, a desirably wide particle size distribution of a collection of fine granular particles or a collection of coarse granular particles may be measured by a "span value." A span value is related to the standard deviation relative the mean particles size value, and is calculated as the ratio (D90−D10)/D50. A wider particle size distribution will have a larger span value. Examples of useful or preferred span values of a collection of irregular fine granular particles may be in a range from 1 to 5. Examples of useful or preferred span values of a collection of irregular coarse granular particles may be in a range from 1 to 5.

As described herein, a multi-modal particle composition contains two collections of mono-modal particles, with one of the collections (referred to as a collection of "irregular fine granular particles," or "fine particles") having a relatively smaller average particle size (D50), and the second collection (referred to as a collection of "irregular coarse granular particles," or "coarse particles") having a relatively higher average particle size (D50).

The average particles size (D50) of the particles in the collection of fine particles can be an average particles size that is useful in a multi-modal particle composition as described. Example average particle sizes of a collection of fine particles may be, e.g., from 1 to 30 microns.

The average particles size (D50) of the particles in the collection of coarse particles can be an average particles size that is useful in a multi-modal particle composition as described. Example average particle sizes of a collection of coarse particles may be, e.g., from 30 to 200 microns.

Also according to useful or preferred examples of multi-modal particle compositions, the average diameter (D50) of the collection of larger-sized (coarse) particles is in a range from 4 to 7 times the average diameter (D50) of the collection of smaller-sized (fine) particles. This ratio has been identified as a ratio that will provide a desirably useful and desirably high packing density of a modal multi-modal particle composition.

A multi-modal particle composition may contain any relative amounts of the collection of fine particles and the collection of coarse particles. According to useful or preferred examples, a multi-modal particle composition may contain a majority of a collection of irregular coarse particles by weight, and a lower amount of irregular fine particles by weight. A useful or preferred multi-modal particle composition may contain from 10 to 50 weight percent of the collection of irregular fine particles and from 50 to 90 weight percent of the collection of irregular coarse particles, e.g., from 20 to 40 weight percent of the collection of irregular fine particles and from 60 to 80 weight percent of the collection of irregular coarse particles, based on total weight composition, or based on total weight of the collection of irregular fine particles and the collection of irregular coarse particles.

A multi-modal particle composition as described can have a relatively high packing density and a correspondingly low void space. A multi-modal particle composition contains the particles in a volume ("bulk volume") that contains the particles with open spaces (e.g., containing air) (sometimes referred to as "void spaces") present between surfaces of the particles. In this form, a "packing density" of the particle composition refers to a fraction (percent) of the bulk volume that is taken up by the particles—i.e., a volume of the particles that make up the collection divided by the "bulk volume" that is defined as the particles and the spaces between the particles.

A measure that is related to packing density of a volume (bulk volume) of particles is "void fraction" of the particles, which is sometimes referred to as "porosity." Porosity or "void fraction" refers to the relative amount of the void space (i.e., "air space") in the bulk volume of particles as a percent of the total bulk volume (particles and void space). Void space is calculated as a fraction of the bulk volume that is open space divided by the total bulk volume of the body. Alternately, void space (percent) is unity (1.00) minus the packing density. A composition that has zero percent void space (zero percent porosity) is completely solid.

Multi-modal particle compositions as described can have a desirably high packing density, which may be packing density of at least 55, 60, or 62 percent.

A multi-modal particle composition as described can be useful for forming shaped bodies, including shaped precursor bodies, and final shaped bodies from the shaped precursor bodies. According to general method, the particles of the multi-modal particle composition, in a powder form, may be combined with optional binder and formed into a shaped precursor body by any of various methods that may include a compaction methods, an additive manufacturing method, a molding method, among others.

According to a compaction method, a composition that contains the particles optionally with binder composition or other additives is placed under pressure to form a shaped precursor body. A specific type of compaction method is referred to as "isotactic" compression, by which a "feedstock" composition that contains the particles is formed into a shaped precursor body using a mold and high pressure. The shaped precursor body can be subsequently processed, including by heating, to form a finished shaped body.

According to different examples, a multi-modal particle composition as described, optionally in combination with a binder composition, may be formed into a shaped precursor body by any of a variety of different known types of additive manufacturing techniques. In these methods, generally, the particles are placed in a feedstock composition that is formed into a multi-layer precursor body having a desired shape, and that contains the particles of the multi-modal particle composition still in the form of individual particles. The shaped precursor body can be further processed in a manner that causes the particles to fuse or melt together to form a finished shaped body, preferably having a low porosity as described.

A multi-modal particle composition as described may be useful for forming a shaped (three-dimensional) precursor body by use of various known additive manufacturing methods, including methods that are commonly referred to as "3-D printing" techniques. Different varieties of additive manufacturing techniques are known. Specific examples are those commonly referred to as "powder-bed" additive manufacturing methods, which include various "binder jet printing" techniques. Other examples include stereolithography techniques (SLS) and "feedstock dispensing methods" (FDMs).

By use of an additive manufacturing technique, a feedstock composition that contains a multi-modal particle composition can be processed to individually and sequentially form multiple layers (e.g., "paths") of solidified feedstock composition that contains the multi-modal particle composition dispersed in solidified binder composition. The solidified binder composition acts as a structure that holds the particles of the multi-modal particle composition together within the solidified feedstock composition. Using a series of additive manufacturing steps, the multiple layers of solidified feedstock are sequentially formed into a multi-layer composite made from the layers of solidified feedstock, and which is an example of a shaped precursor body.

In more detail, additive manufacturing processes that are useful for forming a shaped precursor body in the form of a multi-layer composite that contains a multi-modal particle composition, can involve a feedstock composition that contains the multi-modal particle composition and one or more ingredients that combine to form a binder composition. The binder composition may be combined with the particles as a feedstock, and the binder composition may be solidified (hardened, cured, or the like) during an additive manufacturing step to produce a solidified feedstock composition that contains solidified binder composition acting as a physical support structure (matrix) for the particles. The relative amounts of particles and binder composition in a feedstock composition may be any useful amounts, e.g., amounts of from 60 to 95 or from 70 to 90 weight percent particles, and from 5 to 40 or from 10 to 30 weight percent binder, based on total weight feedstock or based on a total weight of particles and binder in a feedstock composition.

Steps of combining the particles with the binder composition and causing the binder composition to solidify as a layer of a composite may vary with different types of additive manufacturing techniques, e.g., steps of combining the particles with binder composition may be different for powder-bed techniques, and for different versions of powder-bed techniques, compared to stereolithography and feedstock dispensing methods. The ingredients of the binder composition may also be different for different types of additive manufacturing techniques.

In general, binder composition may include any material that is capable of being solidified as part of a feedstock composition, or by being added to a feedstock layer, to selectively form solidified feedstock at portions of a feedstock layer. Examples generally include organic materials such as polymers (e.g., synthetic polymers or natural polymers, either of which may optionally be chemically curable), inorganic materials such as clays and other inorganic particles, fugitive materials, etc.

Examples of materials that can be useful as a binder composition, or component thereof, include polymeric materials, which may be thermoplastic or irreversibly chemically curable, as well as non-polymeric, inorganic particles such as a clay, that can be suspended in a liquid and dried by removal of the liquid to form a solid material.

A polymeric binder may be a thermoplastic polymer that may be reversibly heated to form a liquid and then cooled to form a solid (e.g., may be reversibly melted and solidified). Alternately or additionally, a polymeric binder material may be chemically curable, for example by exposure to elevated temperature (thermosetting) or by exposure to electromagnetic radiation such as from a laser, e.g., a UV laser.

Advantageously, a feedstock composition that contains a multi-modal particle composition as described and added ingredients such as a binder can exhibit a relatively high density of the particles of the multi-modal particle composition, because the particles exhibit a high packing density. The high packing density of the multi-modal particle composition can be effective to prepare a feedstock composition that contains the particles and binder that also has a high concentration of the particles, referred to as a volume percent of the particles in the feedstock. A "volume percent" of particles in a feedstock composition refers to the amount (percent) by volume of the particles in a volume of feedstock, based on the total volume of the feedstock. The same measure of volume percent can also be applied to a shaped precursor body that is formed using the feedstock.

Example feedstock compositions and shaped precursor bodies made from the feedstock composition may contain an amount of particles, as a percent of volume of the body, that is at least 55, 60, or 62 percent, based on total volume of the feedstock composition or shaped precursor body.

A shaped precursor body can be further processed by steps ("post-processing") that include one or more of a step to remove the binder composition from the body, sometimes referred to as a "debind" step, and a step to fuse together the particles of the precursor body, i.e., a heating or a "sintering step." Optionally, if the feedstock is of a type that contains chemically-curable polymer binder, another step may be performed to further harden or "cure" the solidified feedstock by further causing an additional amount of cure of the curable polymer binder.

A debind step and a sintering step may be performed in a single apparatus (e.g., oven or furnace) or may be performed according to a sequence of a debind step performed in a first apparatus, and a subsequent sintering step being performed in a second (different) apparatus. A temperature used for a debind step is lower than a temperature used for a sintering step. A temperature for a thermal debind step can depend on the type of polymer of a binder composition, with examples being in a range below 600 degrees Celsius, for example in a range from 100 to 550 or 600 degrees Celsius. A temperature for a sintering may be generally higher than a temperature for a debind step, e.g., greater than 550 or 600 degrees Celsius.

A useful or preferred debind step will remove ingredients of the binder composition from the shaped precursor body, leaving behind only the particles. Example debind steps, referred to as "thermal debind" steps, expose the shaped precursor body to an elevated temperature that is sufficient to remove the ingredients of the binder composition from the shaped precursor body. Alternately or additionally, depending on the type of binder composition, a debind step may exposes the shaped precursor body to a chemical solvent that removes the ingredients of the binder composition from the multi-layer composite, which is referred to as a "chemical debind" step.

Following the debind step, the particles of the shaped precursor body remain as a substantially residue-free porous body that includes substantially only the particles. Following a debind step, in the absence of a heating or sintering step, the body may be in the form of the particles in an unfused, un-sintered state, but is self-supporting.

When the particles of the multi-modal particle composition are inorganic, e.g., ceramic or metal, the shaped precursor body can be processed by a heating step, e.g., a sintering step. The term "sintering" as used herein has a meaning that is consistent with the meaning that this term is given when used in the art of forming sintered bodies. Consistent therewith, the term "sintering" can be used to refer to processes of bonding (e.g., "solid state welding" or "fusing") together a collection of small, sinterable particles of one or more different types (sizes, compositions, shapes, etc.) by applying heat to the particles (i.e., to the precursor body) in a non-oxidizing environment so that surfaces of the particles reach a temperature that causes the particle surfaces to become fused together by a physical (mechanical) bond between the particles surfaces, but that does not cause the particles to melt (i.e., none of the metal materials reaches its melting temperature).

A sintering step is performed at a temperature that is above the sintering point of inorganic particles of the body, but below the melting temperature of the particles. As used herein, a "sintering point" of a particle is a temperature at which the material of the particle is capable of being sintered, i.e., a temperature at which particles of a body begin to adhere to other particles of the body, and adjacent particles can become fused together. A sintering point of a material (e.g., metal) is normally below a melting temperature of the material, meaning the temperature at which the particles become liquid.

Useful temperatures for performing a sintering step can depend on factors such as the size, shape, and composition of the inorganic particles. Different types, sizes, and shapes of particles may have different sintering points, and may require either a longer sintering period or a shorter sintering period (period of time held at a sintering temperature). Metal particles made of nickel, nickel alloy, stainless steel, and the like may typically have a sintering temperature in a range from about 550 about 1300 degrees Celsius. Ceramic particles made of alumina or zirconia and the like may typically have a sintering temperature in a range from about 1600 to about 2000 degrees Celsius. Particles made of refractory metal or silicon carbide may typically have a sintering temperature in a range from about 1600 to about 2100 degrees Celsius.

Typical sintering periods may be in a range from 5 minutes to 60 minutes, depending on the particle material, particle size, and particle shape.

A sintering step can be performed in a furnace or oven and in a non-oxidizing atmosphere that will not react with or otherwise detrimentally affect the particles of the body being sintered, e.g., in a vacuum or in an atmosphere of concentrated or pure hydrogen, concentrated or pure inert gas, or a combination of concentrated or pure hydrogen and inert gas.

For a body that is made from silicon carbide particles, an added step can be to process the body to form reaction bonded silicon carbide. Methods of forming reaction bonded silicon carbide are known, with an example being described at U.S. Pat. No. 8,142,845.

After post-processing of the shaped precursor body has been completed, the body is considered to be a "finished shaped body." Because useful multi-modal particle compositions described herein can preferably have a high packing density, a finished shaped body prepared from a multi-modal particle composition as described can have a low porosity, and a high relative apparent density.

Examples of shaped finished bodies prepared using multi-modal particle compositions as described, can have a desirably low porosity, e.g., a porosity that is below 15, 12, or below 10 percent.

A "relative density" is a density of a body compared to a "theoretical" density of the body having zero porosity, i.e., is the density of the body divided by density of the material that forms the body. Examples of shaped finished bodies prepared using multi-modal particle compositions as described, can have relative apparent density that is at least 75, 80, or 85 percent.

A final shaped body prepared as described can be a body that has specific features of shape, size, and physical and mechanical properties. Useful examples of shaped final bodies can be bodies that are advantageously exhibit low porosity, with physical properties of strength, wear resistance, temperature resistance, and chemical inertness.

Specific properties of a final shaped body will depend on the material of the body. According to useful or preferred examples, shaped final bodies made from silicon carbide can be useful as parts that require high strength, wear resistance, temperature resistance, chemical inertness, good thermal stability and low heat conductivity.

Silicon carbide has a wide and varied range of uses, because silicon carbide has a combination of highly useful physical properties. Items that are made of silicon carbide are known to exhibit: high hardness (approaching that of diamond), low density (similar to that of aluminum) a high melting point, high wear resistance and corrosion resistance, excellent oxidation resistance, strength and stability at high temperatures, stability in challenging chemical environments, and good thermal conductivity with low thermal expansion. With its highly useful combination of physical properties, silicon carbide is used to prepare many items that require high strength, chemical resistance, wear resistance, and stability at high temperatures. Examples include: high-temperature bearings, composite armor such as bulletproof plates, scanning mirrors, glasses, nozzles, high-temperature corrosion-resistant parts, and electronic equipment parts.

Example Compositions and Methods

Aspect 1. A powder composition having a multi-modal particle size distribution, the composition comprising: a collection of irregular fine granular particles having a fine particle size distribution and an average fine particle diameter (D50 value), and a collection of irregular coarse granular particles having a coarse particle size distribution and an average coarse particle diameter (D50 value) that is in a range from 4 to 7 times the average fine particle diameter (D50 value).

Aspect 2. The composition of Aspect 1, wherein: the fine particle size distribution has a standard deviation in a range from 1 to 5; and the coarse particle size distribution has a standard deviation in a range from 1 to 5.

Aspect 3. The powder composition of Aspect 1 or 2, having a packing density of at least of at least 60 percent.

Aspect 4. The composition of any of Aspects 1 through 3, wherein: the irregular fine particles have an average fine particle diameter (D50 value) in a range from 1 to 30 microns; and the irregular coarse particles have an average coarse particle diameter (D50) in a range from 30 to 200 microns.

Aspect 5. The composition of any of Aspects 1 through 4, comprising: from 10 to 50 weight percent irregular fine particles; and from 50 to 90 weight percent irregular coarse particles, based on total weight composition.

Aspect 6. The composition of any of Aspects 1 through 5, wherein: the irregular fine particles are selected from metal particles and ceramic particles; and the irregular coarse particles are selected from metal particles and ceramic particles.

Aspect 7. The composition of any of Aspects 1 through 6, wherein: the irregular fine particles consist of silicon carbide particles; and the irregular coarse particles consist of silicon carbide particles.

Aspect 8. The composition of any of Aspects 1 through 7, consisting essentially of the irregular fine particles and the irregular coarse particles.

Aspect 9. The composition of any of Aspects 1 through 7, consisting of the irregular fine particles and the irregular coarse particles.

Aspect 10. The composition of any of Aspects 1 through 9, wherein the irregular fine particles and the irregular coarse particles are silicon carbide.

Aspect 11. A method of forming a composition of any of Aspects 1 through 10, the method comprising combining a collection of the irregular fine particles with a collection of the irregular coarse particles.

Aspect 12. A feedstock composition comprising inorganic particles and binder composition, the feedstock composition comprising:

inorganic particles having a multi-modal particle size distribution, the inorganic particles comprising:

a collection of irregular fine particles having a fine particle size distribution and an average fine particle diameter, and a collection of irregular coarse particles having a coarse particle size distribution and an average coarse particle diameter that is in a range from 4 to 7 times the average fine particle diameter; and binder composition that is adapted to solidify to form a body comprising the inorganic particles and solidified binder composition.

Aspect 13. The composition of Aspect 12, wherein: the fine particle size distribution has a standard deviation in a range from 1 to 5; and the coarse particle size distribution has a standard deviation in a range from 1 to 5.

Aspect 14. The composition of Aspect 12, wherein the inorganic particles have a packing density of at least 60 percent.

Aspect 15. The composition of any of Aspects 12 through 14, wherein: the irregular fine particles have an average fine particle diameter (D50 value) in a range from 1 to 30 microns; and the irregular coarse particles have an average coarse particle diameter (D50) in a range from 30 to 200 microns.

Aspect 16. The composition of any of Aspects 12 through 15, comprising: from 10 to 50 weight percent irregular fine particles; and from 50 to 90 weight percent irregular coarse particles, based on total weight composition.

Aspect 17. The composition of any of Aspects 12 through 16, wherein: the irregular fine particles are selected from metal particles and ceramic particles; and the irregular coarse particles are selected from metal particles and ceramic particles.

Aspect 18. The composition of any of Aspects 12 through 16, wherein: the irregular fine particles consist of silicon carbide particles; and the irregular coarse particles consist of silicon carbide particles.

Aspect 19. The composition of any of Aspects 12 through 18, comprising: from 10 to 30 weight percent inorganic particles having a multi-modal particle size distribution; and from 70 to 90 weight percent binder composition, based on total weight feedstock composition.

Aspect 20. A method of forming a feedstock composition of any of Aspects 12 through 19, the method comprising combining: the collection of irregular fine particles; the collection of irregular coarse particles; and the binder composition.

Aspect 21. A method of forming a shaped body that comprises inorganic particles dispersed in binder composition, the method comprising:

using feedstock composition comprising inorganic particles having a multi-modal particle size distribution, the feedstock composition comprising:

a collection of irregular fine particles having a fine particle size distribution and an average fine particle diameter, and a collection of irregular coarse particles having a coarse particle size distribution and an average coarse particle diameter that is in a range from 4 to 7 times the average fine particle diameter, and binder composition; and forming the feedstock composition into a shaped body that comprises the inorganic particles and solidified binder composition.

Aspect 22. The method of Aspect 21, comprising forming the feedstock composition into a shaped precursor body by an additive manufacturing step.

Aspect 23. The method of Aspect 21 or 22, wherein the inorganic particles have a packing density of at least 60 percent.

Aspect 24. The method of any of Aspects 21 through 23, wherein: the irregular fine particles have an average fine particle diameter (D50 value) in a range from 1 to 30 microns; and the irregular coarse particles have an average coarse particle diameter (D50) in a range from 30 to 200 microns.

Aspect 25. The method of any of Aspects 21 through 24, comprising: from 10 to 50 weight percent irregular fine particles; and from 50 to 90 weight percent irregular coarse particles, based on total weight composition.

Aspect 26. The method of any of Aspects 21 through 25, wherein: the irregular fine particles consist of silicon carbide particles; and the irregular coarse particles consist of silicon carbide particles.

Aspect 27. The method of any of Aspects 21 through 26, wherein the feedstock composition comprises: from 10 to 30 weight percent inorganic particles having a multi-modal particle size distribution; and from 70 to 90 weight percent binder composition, based on total weight feedstock composition.

Aspect 28. A method of forming a low porosity inorganic sintered body, the method comprising:

using feedstock composition comprising inorganic particles having a multi-modal particle size distribution, the feedstock composition comprising:

a powder composition having a multi-modal particle size distribution, comprising a collection of irregular fine particles having a fine particle size distribution and an average fine particle diameter (D50 value), and a collection of irregular coarse particles having a coarse particle size distribution and an average coarse particle diameter (D50 value) that is in a range from 4 to 7 times the average fine particle diameter, and binder composition;

forming the feedstock composition into shaped precursor body that comprises solidified binder composition and the inorganic particles;

heating the shaped precursor body to a temperature that causes the irregular fine particles and the irregular coarse particles to become fused together to form the inorganic sintered body.

Aspect 29. The method of Aspect 28, comprising forming the feedstock composition into a shaped precursor body by an additive manufacturing step.

Aspect 30. The method of Aspect 28 or 29, wherein the inorganic sintered body has a porosity below 5 percent.

Aspect 31. The method of any of Aspects 28 through 30, wherein the inorganic sintered body comprises at least 97 weight percent silicon carbide.

Aspect 32. The method of any of Aspects 28 through 31, wherein the inorganic sintered body comprises: a chemical-mechanical polishing pad conditioner, a cutting tool, a wear-resistant surface, or a heat-resistant surface.

Aspect 33. The method of any of Aspects 28 through 32, comprising reaction-bonded silicon carbide.

Aspect 34. The method of any of Aspects 28 through 33, wherein the particle composition has a packing density of at least 60 percent.

Aspect 35. The method of any of Aspects 28 through 34, wherein the feedstock composition comprises: from 10 to 30 weight percent inorganic particles having a multi-modal particle size distribution; and from 70 to 90 weight percent binder composition, based on total weight feedstock composition.

The invention claimed is:

1. A method of forming a shaped body that comprises inorganic particles dispersed in binder composition, the method comprising:

using feedstock composition comprising inorganic particles having a multi-modal particle size distribution, the feedstock composition comprising:

from 10 to 30 weight percent inorganic particles based on the total weight of the feedstock composition, the inorganic particles having a multi-modal particle size distribution including a collection of irregular fine particles having a fine particle size distribution and an average fine particle diameter, and a collection of irregular coarse particles having a coarse particle size distribution and an average coarse particle diameter that is in a range from 4 to 7 times the average fine particle diameter, and from 70 to 90 weight percent binder composition, based on the total weight of the feedstock composition; and forming the feedstock composition into a shaped body that comprises the inorganic particles and solidified binder composition.

2. The method of claim 1, comprising forming the feedstock composition into a shaped precursor body by an additive manufacturing step.

3. The method of claim 1, wherein the inorganic particles have a packing density of at least 60 percent.

4. The method of claim 1, wherein the irregular fine particles have an average fine particle diameter (D50 value) in a range from 1 to 30 microns, and the irregular coarse particles have an average coarse particle diameter (D50) in a range from 30 to 200 microns.

5. The method of claim 1, comprising:

from 10 to 50 weight percent irregular fine particles, and from 50 to 90 weight percent irregular coarse particles, based on total weight composition.

6. The method of claim 1, wherein the irregular fine particles consist of silicon carbide particles, and the irregular coarse particles consist of silicon carbide particles.

7. A method of forming a low porosity inorganic sintered body, the method comprising:

using feedstock composition comprising inorganic particles having a multi-modal particle size distribution, the feedstock composition comprising:

from 10 to 30 weight percent of a powder composition having a multi-modal particle size distribution based on the total weight of the feedstock composition, the powder composition comprising a collection of irregular fine particles having a fine particle size distribution and an average fine particle diameter (D50 value), and a collection of irregular coarse particles having a coarse particle size distribution and an average coarse particle diameter (D50 value) that is in a range from 4 to 7 times the average fine particle diameter, and from 70 to 90 weight percent binder composition, based on the total weight of the feedstock composition;

forming the feedstock composition into shaped precursor body that comprises solidified binder composition and the inorganic particles; and heating the shaped precursor body to a temperature that causes the irregular fine particles and the irregular coarse particles to become fused together to form the inorganic sintered body.

8. The method of claim 7, comprising forming the feedstock composition into a shaped precursor body by an additive manufacturing step.

9. The method of claim 7, wherein the inorganic sintered body has a porosity below 5 percent.

10. The method of any of claim 7, wherein the inorganic sintered body comprises at least 97 weight percent silicon carbide.

11. The method of claim 7, wherein the particle composition has a packing density of at least 60 percent.

* * * * *